US 12,451,681 B2

(12) United States Patent
Hurwitz (10) Patent No.: US 12,451,681 B2
(45) Date of Patent: Oct. 21, 2025

(54) MULTI-FUNCTION ELECTRICAL SENSING (71) Applicant: Analog Devices International Unlimited Company, Limerick (IE)

(72) Inventor: Jonathan Ephraim David Hurwitz, Edinburgh (GB)

(73) Assignee: Analog Devices International Unlimited Company, Limerick (IE)

( * ) Notice: Subject to any disclaimer, the term of this patent is extended or adjusted under 35 U.S.C. 154(b) by 208 days.

(21) Appl. No.: 17/938,620

(22) Filed: Oct. 6, 2022

(65) Prior Publication Data
US 2024/0120725 A1 Apr. 11, 2024

(51) Int. Cl.
*H02H 1/00* (2006.01)
*G01R 21/133* (2006.01)
*G01R 31/52* (2020.01)

(52) U.S. Cl.
CPC ......... *H02H 1/0015* (2013.01); *G01R 21/133* (2013.01); *G01R 31/52* (2020.01); *H02H 1/0092* (2013.01)

(58) Field of Classification Search
CPC .. H02H 1/0015; H02H 1/0092; G01R 21/133; G01R 31/52; G01R 15/181; G01R 31/1272
USPC .......................................................... 361/42
See application file for complete search history.

(56) References Cited

U.S. PATENT DOCUMENTS

| 6,128,169 A * | 10/2000 | Neiger ................... H02H 3/334 324/520 |
| 6,567,250 B1 | 5/2003 | Haun et al. |
| 2003/0058596 A1* | 3/2003 | MacBeth ............. H02H 1/0015 361/42 |
| 2010/0165521 A1* | 7/2010 | Changali .............. H02H 1/0015 361/42 |
| 2016/0334454 A1* | 11/2016 | Lentz ................. G01R 31/3275 |
| 2018/0059175 A1* | 3/2018 | Hase ...................... G01R 31/52 |
| 2019/0386478 A1* | 12/2019 | Raisigel ................... H02H 3/46 |

OTHER PUBLICATIONS

Y.-J. Wu et al., "IoT Cloud-Edge Reconfigurable Mixed-Signal Smart Meter Platform for Arc Fault Detection," in IEEE Internet of Things Journal, Date of Publication: Sep. 28, 2022 (Year: 2022).*
"International Application Serial No. PCT/EP2023/077469, International Search Report mailed Jan. 30, 2024", 5 pgs.
"International Application Serial No. PCT/EP2023/077469, Written Opinion mailed Jan. 30, 2024", 5 pgs.

* cited by examiner

*Primary Examiner* — Sreeya Sreevatsa
(74) *Attorney, Agent, or Firm* — Schwegman Lundberg & Woessner, P.A.

(57) ABSTRACT

A measurement system includes an arc-fault detection circuit and a second detection circuit coupled to a current transducer. By providing both arc-fault detection and further detection capabilities using the current transducer, the overall circuit size may be reduced. To allow the arc-fault detection circuit and the second detection circuit to provide detection of different events, the circuits may operate at different sampling frequencies.

19 Claims, 7 Drawing Sheets

MULTI-FUNCTION ELECTRICAL SENSING

TECHNICAL FIELD

The present disclosure relates to electrical sensing systems, and in particular to sensing systems capable of detecting arc-faults.

BACKGROUND

An arc-fault is the arcing of electrical current between two contact points on a single wire or on multiple wires. Arc-faults can occur when there is a small break in a wire, with the current arcing across the break to another break in the same wire or a break in one or more adjacent wires. For example an arc-fault may occur between a break in a live wire and a break in an adjacent neutral wire when the insulative material between them has degraded. Often, in alternating current (AC) home or industrial power networks, the arcing occurs at a point of high potential in the AC cycle, where there is a larger potential difference between the contact points.

Arc-faults can cause the conductor (often copper) to heat up and further break down the surrounding insulative material, which may lead to electrical fires. In some instances, when the conductor is heated to a high level, conductive material may spit out and come into contact with the surrounding building fabric. This is particularly problematic in wood or timber-framed buildings. To prevent this, arc-fault circuit interrupt (AFCI) systems monitor the current in a wire(s) and attempt to determine whether an arc-fault is occurring. If it is determined that an arc-fault is occurring, or has occurred, the AFCI may stop or cut-off the supply of electricity to the wire(s), allowing proper diagnosis by an electrician at a later time.

AFCI systems tend to be large, dedicated units that provide only AFCI functionality. This can mean that many premises do not have any means for monitoring for arc-faults in the electrical power systems, or may have only a single AFCI system that monitors the overall supply current that is drawn by the premises (i.e., the current that is drawn by the premises from the power grid). Consequently, the AFCI would cut-off power to the whole premises at the detection of any fault.

SUMMARY

The present disclosure provides improved measurement systems for the detection of arc-faults, combining arc-fault detection circuitry and a second detection circuit which provides at least one of metrology, and short-circuit detection. Both the arc-fault detection circuit and the second detection circuit are coupled to the same current transducer. By providing a system where only a single current transducer is used to provide measurements to the two or more measurement and detection circuits, the overall size and cost of the system may be reduced compared with previous systems that use independent current transducers for each measurement and detection circuit. This makes the use of an AFCI in a premises more feasible as the cost of including that functionality as part of the usual measurement and/or safety equipment (for example, RCD/RCCB/RCBO/circuit breakers) becomes more reasonable. Furthermore, because the AFCI functionality can make use of the same current transducer as other functions, it is possible to include AFCI functionality within, for example, RCD/RCCB/RCBO/circuit breaker devices that each monitor different electrical circuits within a premises (for example, the power outlets on each floor of the premises, the lighting rings on each floor of the premises, etc). Including arc fault detection without providing a breaking or circuit interrupt functionality within smart meters and end equipment that contains metering such as EV charging and Solar inverters can also be used as a fault notification capability to inform the consumer of the risk of an arc fault in their wiring network. Consequently, it is possible to provide more granular arc-fault detection and protection at relatively small additional cost, and implement a protection or interrupt system where only faulty circuits are isolated when an arc-fault is detected, leaving other well-functioning circuits unaffected.

In a first aspect of the present disclosure, there is provided a measurement system for the detection of arc-faults, the measurement system comprising: a current transducer for measuring a current in a current carrying conductor; an arc-fault detection circuit, the arc-fault detection circuit comprising: a first analog-to-digital converter, ADC, having an input that is coupled to an output of the current transducer; a frequency analysis circuit coupled to an output of the first ADC, wherein the frequency analysis circuit is configured to detect arc-faults; and a second detection circuit comprising: a second analog-to-digital converter, ADC, coupled to the output of the current transducer; and a digital processor coupled to an output of the second ADC, the digital processor configured to determine at least one of: a measure of the current in the current carrying conductor; the presence of a short-circuit; and the presence of a residual current.

The first ADC may have a first sample rate and the second ADC may have a second sample rate, the first sample rate being higher than the second sample rate. The first sample rate may be greater than 1 Msps. The first sample rate may be greater than 100 Msps. The current transducer may be a rate of change of current sensor.

The frequency analysis circuit may detect arc-faults through the detection of frequency components of the measured current in the 100 kHz-10 MHz frequency range.

The second detection circuit may further comprise an integrator arranged to couple the output of the current transducer to the input of the second ADC such that the integrator integrates a signal output from the current transducer and the second ADC digitally converts the integrated signal.

The current carrying conductor may be a live conductor of a network, wherein at least one of the frequency analysis circuit and the second detection circuit is configured to receive a voltage measurement between the live conductor and a neutral conductor of the network. The frequency analysis circuit may be configured to detect arc-faults in dependence on the voltage measurement. The digital processor may be configured to determine a power or energy consumption of the network based on the measure of the current and the voltage measurement.

The measurement system may further comprise a circuit breaker configured to break the current in the first current carrying conductor when an arc-fault, a short-circuit or a residual current is detected.

The arc-fault detection circuit and the second detection circuit may be co-packaged in the same integrated circuit. The arc-fault detection circuit and the second detection circuit may be packaged separately in different integrated circuits.

In a second aspect of the present disclosure, there is provided a system comprising: a first circuit for coupling to an output of a current transducer that is for measuring a current in a current carrying conductor, the first circuit configured to perform a frequency analysis on the output of the current transducer to detect an arc-fault event based on frequency components of the measured current in a first frequency range; and a second circuit for coupling to the output of the current transducer, the second circuit configured to perform at least one of: a current measurement; short-circuit detection; residual current detection.

The first circuit may comprise: a filter configured to band-pass filter the output of the current transducer to within the first frequency range; and an analog frequency analysis system, the analog frequency analysis system configured to produce a rectified and averaged signal of an output of the band-pass filter.

The first circuit may further comprise an analog-to-digital converter configured to receive an output of the analog frequency analysis system and provide a digital output; and a digital processor configured to receive the digital output from the analog to digital converter and detect the arc-fault based on the magnitude of the digital output.

The analog frequency analysis system may be further configured to compare the rectified and averaged signal to a threshold, wherein the threshold is indicative of an arc-fault event.

The second circuit may be configured to perform a current measurement and a short-circuit detection based on the frequency components of the measured current within a second frequency range.

In a third aspect of the present disclosure, there is provided a system comprising: a rate of change of current sensor; a first circuit coupled to an output of the current sensor; and a second circuit coupled to the output of the current sensor, wherein the first circuit is configured to perform at least one detection function and the second circuit is configured to perform at least one detection function different to the detection function performed by the first circuit, and wherein the detection functions comprise: arc-fault detection; short-circuit detection; current measurement; residual current detection.

The rate of change of current sensor may be a Rogowski coil.

DRAWINGS

Aspects of the disclosure will now be described by way of example only and with reference to the accompanying drawings, wherein like reference numerals refer to like parts, and wherein.

DETAILED DESCRIPTION

Known arc-fault detection and arc-fault circuit interrupt (AFCI) systems typically require dedicated current transducers and large packages, reducing their usability in space constrained metering units or circuit breakers. By providing a system in which a single current sensor is coupled to multiple detection circuits, for example an arc-fault detection circuit and a second detection circuit which provides other functions, the system size may be reduced. This may allow a greater number of electrical power network analysis and protection functions to be provided in a smaller space, as well as reducing the cost of the system through the strategic reuse of certain components. Each detection circuit may consider a different frequency component of a measured current to provide detection of different events, such as arc-faults, short-circuits and/or metrology to monitor consumption. The metrology and fault detection circuits may also require measurement of voltage over the same frequency range as the current monitoring.

Figure 1:
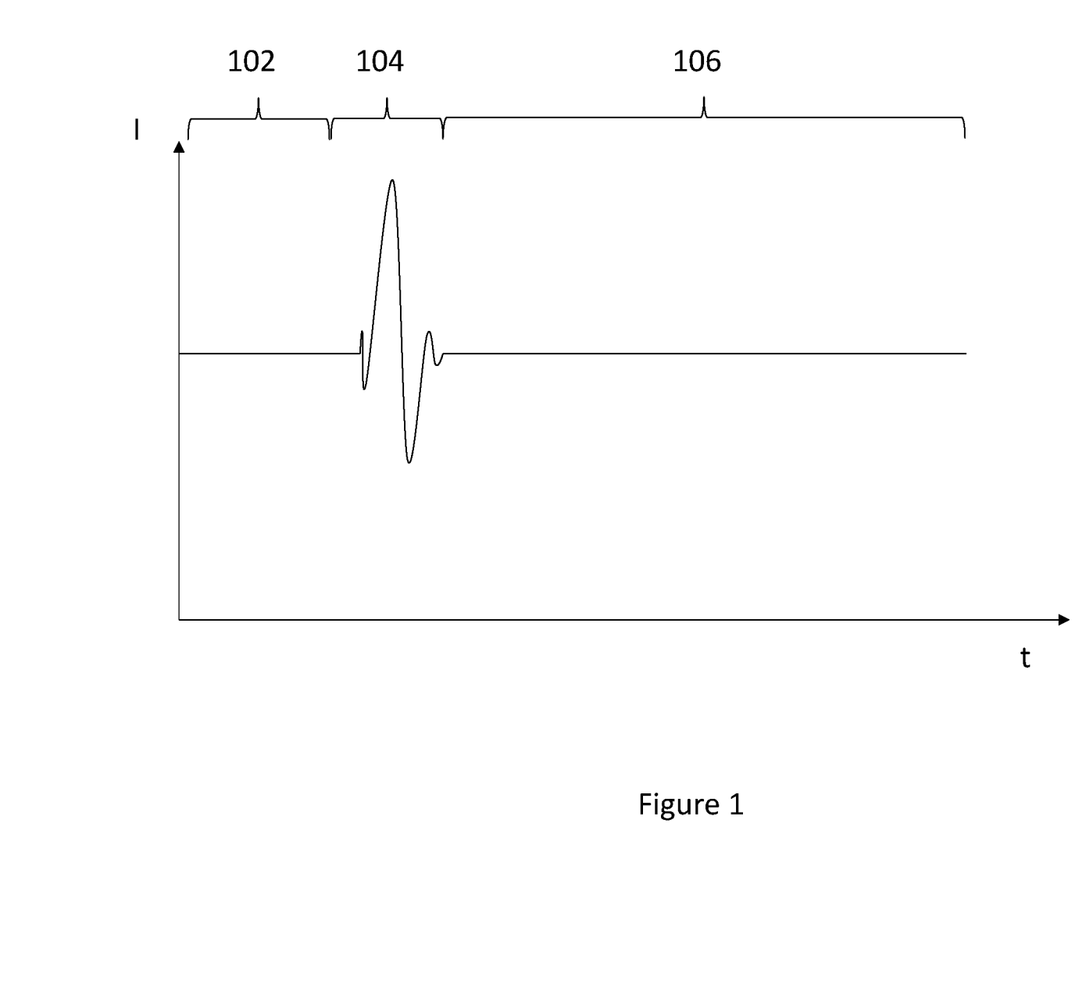
FIG. 1 is a graph of the current draw during an example arc-fault event.
Figure 2:
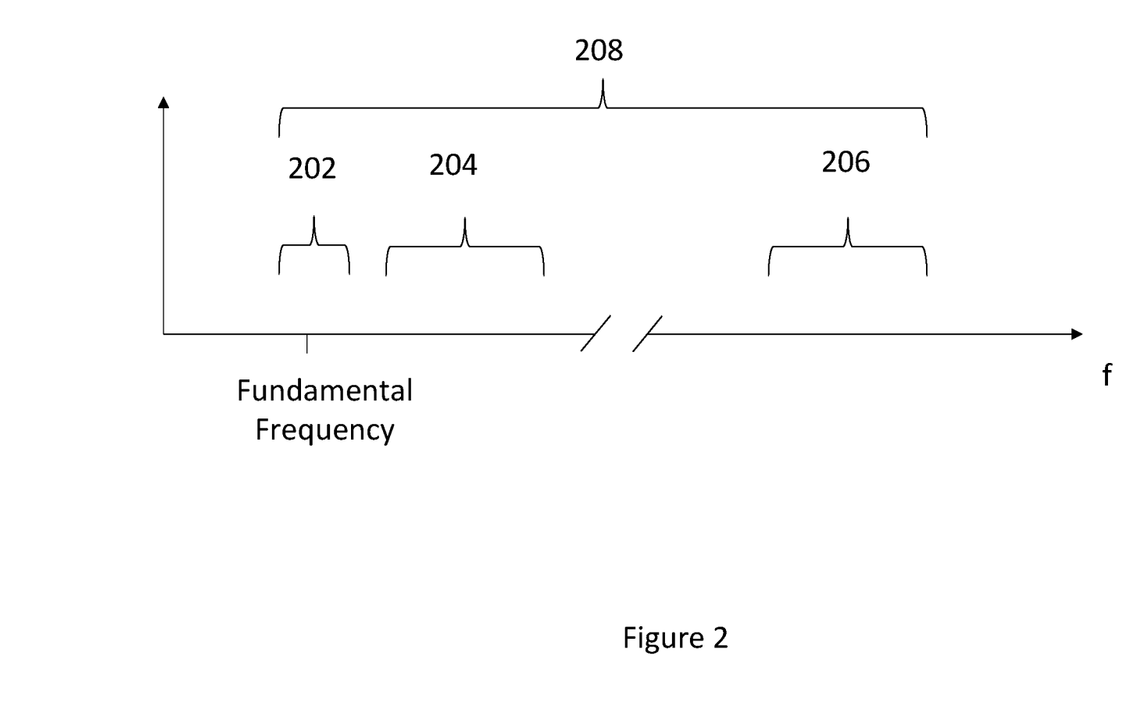
FIG. 2 shows the information which may be included in different frequency components in an electrical power network.

FIG. 1 shows a graph of the current drawn by an electrical network during an arc-fault event. In an AC system, the current drawn by the electrical network alternates, however over a short period of time, during normal operation, current draw may be considered to be substantially constant, or flat. Regions 102 and 106 of FIG. 1 show this substantially constant current draw over a short period of time, indicative of normal operation of the electrical network. During an arc-fault event, a current arcs between two contact points of a single conductor or multiple conductors, essentially jumping between these contact points. Due to the arcing, the current drawn during an arc-fault event, indicated by region 104 of FIG. 1, is substantially greater than during normal operation. The arc-fault event may last a very short period of time and include a very high frequency oscillation, for example the arc-fault may occur only during the highest potential point of the AC cycle. Measuring the voltage across the phase and neutral of the electrical network can be used to determine the potential when the current event 104 occurs and be used to help determine an arc fault. The arc fault may induce a high frequency spike of current that contains very high frequencies. Arc faults can be characterised by the energy they contain in the frequency ranges between >1 MHz, >5 MHz, >10 MHz, and <50 MHz, <20 MHz, <10 MHz, <5 MHz. For example, arc-faults may be characterised by the energy that they contain in the frequency ranges 1 MHz-50 Mhz, 1 MHz-20 MHz, 1 MHz-10 MHz, 1 MHz-5 MHz, as shown in FIG. 2, range 206. This high current can cause heating of insulative materials which surround conductors in the electrical network and degrade them further. Arc faults are often therefore characterised in their initial formation as intermittent with respect to the line sequence, and this helps separate them from other high frequency regular noise sources such as dimming circuits, motor brushes or drive electronics, AC-DC converters etc. whose noise signature is relatively cyclo-stationary.

The high frequency current draw 104 shown in FIG. 1 may be indicative of a parallel arc-fault event. Parallel arc-fault events occur due to, for example, bridging between the live and neutral conductor of an electrical network. As such, they may occur briefly at high voltage points in the AC cycle. Due to the high-current draw in a parallel arc-fault, parallel arc-faults may be considered more dangerous, resulting in a higher chance of damage to surrounding materials and a higher chance of fire. Series arc-fault events may also occur, for example across an airgap in a single conductor, with the current jumping along the single conductor through the airgap. Series arc-faults have a limited maximum current draw compared to parallel arc-faults, as they are limited to the load current drawn by the load connected to the system. A series arc-fault may be detected through a change in the waveform of the drawn current, for example the current drawn may be non-sinusoidal in an AC system. A series arc-fault may therefore be detected by considering lower frequency components compared to a parallel arc-fault.

Short-circuits may also occur in an electrical network. Short-circuits are different to arc-faults, as short-circuits involve the physical shorting of current between two electrical contact points. Short-circuits take place over a longer period of time compared to arc-faults, as the physical short makes it easier for current to flow, meaning they may be lower frequency events that occur over a larger proportion of the AC cycle. The short circuit may occur at any point in the mains cycle. Once a short circuit has occurred its characteristics are often relatively ohmic or resistive, tracking the voltage on the line, and as such a short-circuit contains lower frequency content compared to an arc-fault event, as shown by numeral 204 of FIG. 2.

A similar event that needs protection against is overcurrent protection, for example where devices on the wiring circuit are drawing too much current compared to the safe amount of current draw for that wiring or circuit. This may be because too many devices have been attached to the circuit, one or more of them is heavily loaded or one or more of the devices has developed a fault leading to an efficiency change. The role of a circuit breaker in such a situation is to trip to protect the wiring and electrical networks above and below it. However, whilst the circuit breaker needs to trip in the event of a real issue, it needs to not trip if the event is a false positive. This means that when the current level being measured in a circuit breaker is just below or above the overcurrent level it requires analysis over several mS or even over a half line cycle, a full line cycle or multiple line cycles to differentiate it from another event that wouldn't cause damage or require interruption, such as the in-rush current of a device being plugged in or starting.

The response to the short circuit may be a function of the magnitude of current. For example, when the short-circuit current draw is large but the potential across live and neutral of the electrical network is low, the short circuit protection circuit needs to respond quickly to protect the wiring, the circuit, the switch and to respond quicker than any other breaker upstream, so that the breaker closest to the fault is the one that trips first and can be easily identified and rectified, and to avoid other circuits without the fault being effected. As such the measurement of any current to be used for short circuit protection needs to also be fast and low latency. An example of when a circuit breaker needs to respond very fast is when it is just closed, which is often timed to be at the zero-crossing point of the potential, as the potential builds up towards its peak at 90 degrees of the fundamental frequency, the current, if there is a hard short, will build equally fast. For example if the short is <1 ohm it may only take a few 10 s uS to reach a few 10 s Amps, and if the breaker delayed breaking the circuit, the maximum current could be 100 s Amps in a few mS. The desired requirements for short-circuit detection can be in the <10 uS, <50 uS, <100 uS, <500 uS, <1 mS range. The sensing and measurement bandwidths in these cases need to be in the 10 s kHz, 100 s kHz and even up to the single digit MHz range, and an understanding of the potential phase relative to the current and the status of the switch in the breaker is important. For example, a short circuit may be detected through consideration of the frequency components in the 10 kHz-100 kHz, 10 kHz-500 Khz, or 10 kHz-1 MHz range.

Further, residual currents may be present in the electrical network, representing a current leak within the electrical network. Residual currents may be detected at relatively low-frequencies, by detecting a difference between the current in a live and neutral wire of the electrical network. The differential current detected for such protection may be as low as a few mA and the system may need to be able to respond in a few mS when the current is greater than a few tens of mA. The residual current is low relative to the overall current being passed on live and neutral conductors, which may be in the 10 s of amps. As such the preferred detector for such applications is a magnetic current transformer through which live and neutral conductors pass, although other techniques involving flux gate devices are possible when wanting to be immune to DC currents that may otherwise saturate the core of the current transformer. A residual current detection technique may separately measure current on neutral and live/phase and then calculate the difference, often learning or calibrating the mismatch in the measurements over time to allow the precision of the measurements to match the mA's requirement. In both of these sensing modalities the bandwidths are less than 10 kHz and the decision process is greater than a mS, for example, between 0 kHZ-10 kHz, 10 Hz-10 kHz, 50 Hz-10 kHz, 10 Hz-20 kHz. Residual current detectors also contain circuit breaker functions that break the circuit in the event of an overcurrent or short-circuit and will therefore contain a sensor only on phase or neutral in addition to the sensor of the difference.

Due to the potential fire risk associated with arc-faults and short-circuits, and the danger of a residual or leaking current to a person, it may be important to provide accurate and reliable detection of these events. In some cases, on a given electrical wiring circuit in a home, e.g. a bathroom, it may be a requirement or advisable to be able to detect and protect against both arc-faults and short-circuits. Further, the system may break the current to prevent the arc-fault, short-circuit, residual current or overcurrent event from continuing.

Both home and industrial electrical networks may be provided with an electrical metering unit, allowing a determination of the overall current drawn at the premises and thus a calculation of energy consumption for billing purposes. Conventional systems provide independent units for metering and each safety function, for example an arc-fault circuit interrupt (AFCI) unit(s) (or just an arc-fault detection unit(s)), a short-circuit detection unit(s), a residual current device(s) or a residual current circuit breaker(s), and a metrology or electrical metering unit. This results in duplicated components, a greater space requirement and increased costs.

FIG. 2 shows a graph representing an example frequency domain representation of a measured current signal when an arc-fault is taking place. The majority of the measured current signal may be within a relatively low frequency range, typically at or around the fundamental frequency of the AC network (typically between 50-60 Hz depending on the country). For electrical metering it is therefore important to consider low frequency current draw 202, and in particular current drawn at the fundamental frequency of the electrical network and at lower harmonics of the fundamental. For example, the metering system may consider current drawn between 10 Hz-10 kHz, between the fundamental frequency of the electrical network and 10 kHz, or between the fundamental frequency and the $20^{th}$ harmonic, or $50^{th}$ harmonic or $100^{th}$ harmonic. The range may extend to below the fundamental frequency of the electrical power network, at least because the frequency at which the network operates may drift over time. The current measurements may be taken with a voltage measurement to create a measure of power being used, and the nature of the power and whether it is active or reactive. This is also used to generate a measurement of energy being consumed. An electricity meter may have to measure consumption with currents up to 200 A to an accuracy better than 0.1% while also being able to measure consumption down to 10's mAs with an accuracy of <0.5%. These requirements are often outlined in standards such as IEC 62053 and ANSI C12.20. Because of this large dynamic range, metrology systems most often use over sampling converters (sigma deltas) which sample at a Msps range, and provide an output data rate and analog bandwidth in the Ksps and KHz range. These sampling converters have a latency from their Sinc filters of many clock cycles at this rate. A key criterion of the measurement of current for billing is the stability of the measurement under environmental and lifetime conditions, before example the stability criteria may be in the <1%, <0.5%<0.1% range. In contrast, for fault detection, such as the detection of arc-faults or short-circuits, the stability criteria may be in the >1%, >5%, >10% range. There are other difficult criteria for energy measurement for billing with respect to EMI that are also beyond those of fault detection circuits, for example to be immune to strong external AC and DC magnetic fields to cause only an influence of a fraction of a percent, and to high frequency conducted currents from switching circuitry.

The metering equipment may also be able to detect what type of appliances and devices are attached, when and how much they are consuming by doing non-intrusive load monitoring by analysing their consumption signature both within a line cycle and during the day, week, month, year. All this information is useful to the consumer for tracking and optimising their power consumption. The greater granularity of measurements in a network, for example on every branch within a junction box the more likely the user will be able to track and optimise their consumption. However, for this to happen the cost and space needed for the metering measurement needs to be included with the primary circuit breaking and fault detection functions effectively.

When a short circuit is present in the circuit, the measured current may include significant content at a frequency (or frequencies) that is above the metering frequency range, or may require a detection latency that is below the sampling rate and latency used in the metrology system. The short circuit protection system may be allowed more time to determine an over current event that is closer to the threshold than a larger event, and in this case the frequencies involved may include the metering range. Therefore, to determine a short-circuit the system may consider frequency components of a measured current in a middle frequency range 204 of the measured current signal. For example, current draw between 10 kHz-100 kHz may be indicative of a short-circuit or over current event. The frequency range of interest for short circuit detection may be between 5 kHz-100 kHz, 10 kHz-200 kHz, 10 kHz-500 kHz. The short-circuit detection may further be made through considerations of current draw in a wider range 208, for example through consideration of the frequencies in the metering range 202 as well as the specific short circuit detection frequency range 204, for example current draw in the 10-10 kHz frequency range may be indicative of a short-circuit or over current event. Bandwidths of short circuit detect systems sometimes need to be in the 100's KHz or low MHz range to adequately protect the network or the switch in the case of solid-state switches like SiC switches, for example, 10 Hz-1 Mhz, 100 Hz-1 Mhz, 1 kHz-1 Mhz, 1 kHz-500 kHz.

In contrast, and as described above, parallel arc-fault events typically occur very quickly over a short period of time. Consequently, signal components within the measured current draw that are associated with arc-faults may be within a relatively high frequency range 206. For example, current draw at frequencies greater than 1 MHz, between 1 MHz-10 MHz or at frequencies >20 MHz, may be indicative of an arc fault event. In contrast, series arc-faults may be determined by considering lower frequency ranges, such as the frequency range 202 considered for metrology or the frequency range 204 considered for short-circuit detection.

By considering different frequency components of the current drawn, a measurement system may act to provide metrology and/or short-circuit detection and interrupt, as well as arc-fault detection and optionally interrupt. Beneficially, this may allow a system to provide these functions in single package.

Figure 3:
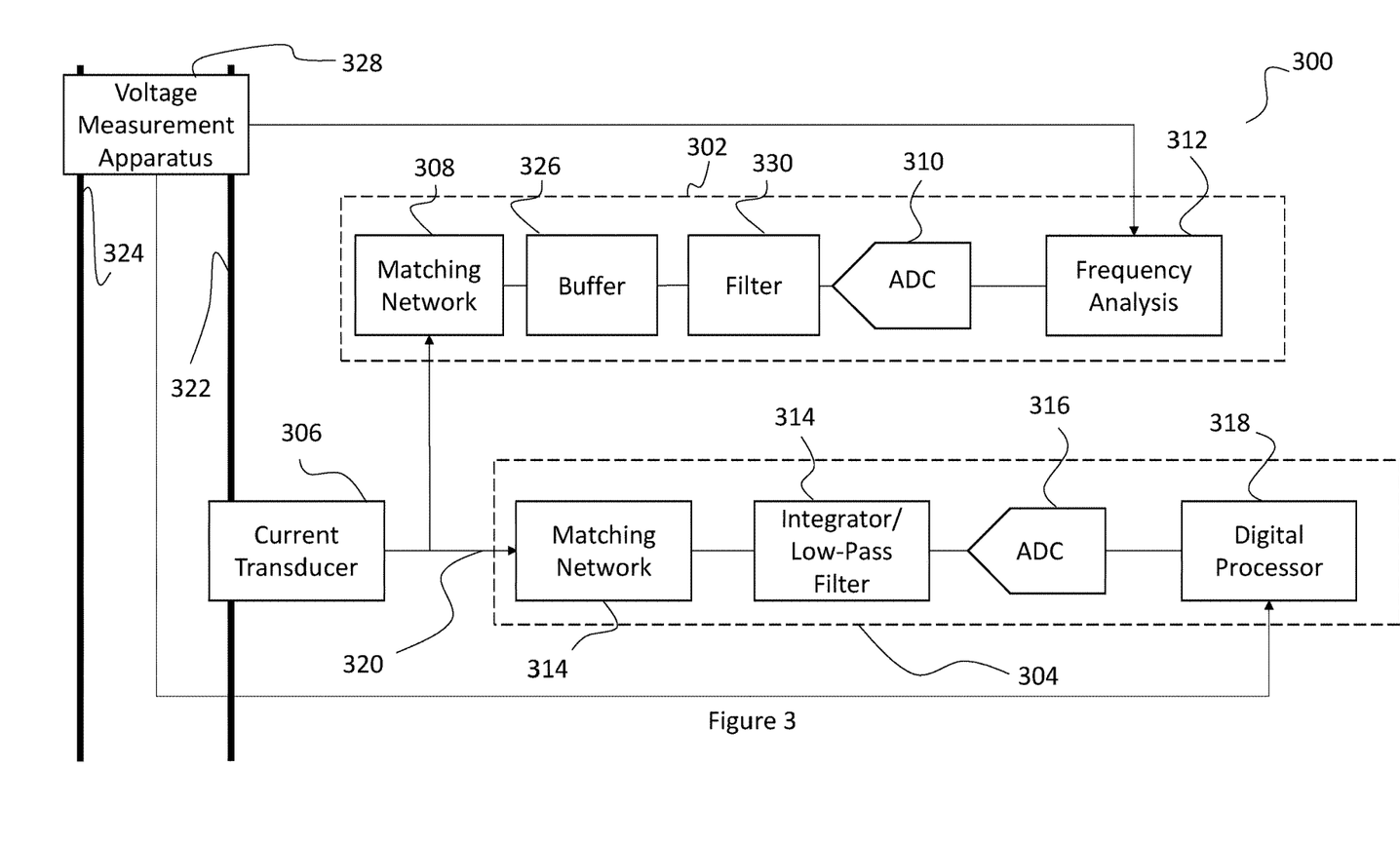
FIG. 3 is a first schematic of a measurement system for the detection of an arc-fault event in accordance with an aspect of this disclosure.

FIG. 3 shows a measurement system 300 including both a first circuit 302 and a second circuit 304. The first circuit 302 provides arc-fault detection functions, whilst the second circuit 304 provides metrology and/or short-circuit detection functions and/or residual current detection and/or overcurrent detection.

The measurement system 300 includes a current transducer 306 configured to measure the current passing through a current carrying conductor 322 of an electrical circuit or network. The electrical circuit or network may include a first current carrying conductor 322 and a neutral conductor 324. Whilst this represents a single-phase system, it is clear that the techniques described herein are applicable to a three-phase system comprising three phase conductors and a neutral conductor, or other types of electrical network. The current transducer may be a rate of change of current sensor, which is a current sensor responsive to a changing current in the current carrying conductor, such that the output of the current sensor is proportional to the rate of change of current, or di/dt. Rate of change of current sensors may therefore be referred to as di/dt current sensors. Rate of change of current sensors provide a good high-frequency response, as their measurement gain increases with signal frequency, which may provide a better SNR for higher frequency signals. As arc-fault events are high frequency events (~1 MHz), the improved SNR of a rate of change of current sensor at this high frequency may allow an arc-fault to be detected more accurately using the rate of change of current sensor measured signal. For example, the rate of change of current sensor may be an air-core current sensor, such as a Rogowski coil. Such a di/dt sensor may be implementable on a PCB or be wound around a structure. PCB based coils have the advantage of cost and regular structure, but they suffer from small signal size and need special winding topologies to reject external magnetic fields.

Rate of change of current sensors are more challenging to be used for metering as they are proportional to frequency response and their small signal size at the fundamental mean that either analog integration is needed with the associated issues of increased noise and drift from large resistors and capacitors often used in analog integration. If digital integration is used that the signal bandwidth is limited at a few kHz through analog means in order to keep the amount of dynamic range needed in the amplification and digitisation prior to the digital integrator at a manageable level to avoid clipping which will introduce rectification and large errors to the integrated current, in this case current draw at higher frequencies, for example 20 kHz may be lost.

Whilst rate of change of current sensors provide additional high frequency signal, other current transducers or current sensors may be used, for example, a current transformer (CT) or a current shunt or a hall effect or other magnetic field sensor.

The first circuit 302, or arc-fault detection circuit, is configured to perform a frequency analysis on the output of the current transducer 306 to determine the occurrence of an arc-fault event. The first circuit 302 may optionally include a first matching network 308, configured to match the impedance of the current transducer 306, preventing or reducing signal reflections. The skilled person will readily appreciate how to implement such a matching network and, as such, this will not be further described in this disclosure. The path may also include a buffer 326 to separate the arc-fault detection circuit 302 from the current transducer 320, for example to separate any dependence on the operation of the first circuit 302 from the operation of the second circuit 304. For example, if the detection mechanism includes a switching stage or mixing stage the buffer 326 will prevent charge being kicked back. The buffer stage 326 may contain a gain element and/or a filtering element to further precondition the arc fault signal of interest. Whilst the buffer 326 is shown coupled to the output of the matching network, it may alternatively be positioned prior to the matching network 308. Alternatively, the buffer 326 may be external to the first circuit 302, for example coupled to the input of the first circuit 302. The matching network 308, buffer 326 and filter 330 may be implemented using a single circuit, or separate circuits. Further, these circuits may not be included, or only a subset of these circuits included.

The first circuit 302 further includes a first analog-to-digital converter (ADC) 310 and a frequency analysis circuit 312. The frequency analysis circuit 312 may be a digital processor. The first ADC 310 may be any suitable type of ADC, for example a flash ADC, a SAR ADC, a pipelined ADC, etc. The first ADC 310 converts the current transducer's 306 analog output into a digital signal and supplies this to the frequency analysis circuit 312. The frequency analysis circuit 312 is configured to monitor for the occurrence of an arc-fault in the electrical network. For example, the frequency analysis circuit 312 may monitor for frequency components of the measured current in the 5 MHz-20 MHz range, or range 206, of the measured current, wherein an arc-fault is detected if an amplitude/intensity/magnitude of a component within the monitored frequency range exceeds a threshold amount (for example, a threshold amount that is set at a level to avoid normal signals within that frequency range, such as normal levels of noise, being interpreted as an arc-fault). The threshold may be set to any suitable value depending on the characteristics of the measurement system 300 and/or characteristics of the circuit being monitored. The system may determine energy in a band using a digital bandpass filter, or by using a more granular frequency analysis technique, such as performing a fast Fourier transform, FFT, to determine the energy in multiple 'bins' of frequency.

As mentioned earlier there may be in addition a measurement of the line voltage provided by a voltage measurement apparatus 328. The frequency analysis system 312 may monitor where the energy in the frequency band of interest occurs both within the voltage cycle of the AC system, for example where the energy representative of an arc-fault occurs within a single AC cycle and/or where the energy representative of an arc-fault occurs over multiple cycles. This may reduce the likelihood of a false alarm/erroneous detection of an arc-fault event. For example, an arc-fault may be detected through the detection of an intermittent high-frequency current draw with respect to the line sequence. This ensures the system can determine the difference between an arc-fault and other regular high frequency noises whose noise signature is relatively cyclo-stationary.

The first ADC 310 may be configured or selected to have a relatively high sample rate, capable of providing sufficient definition to the frequency components of the drawn current which are relevant to arc-fault detection. For example, the sample rate of the first ADC 310 may be greater than 1 Msps, or greater than 10 Msps, or greater than 100 Msps. As previously discussed, the frequencies of interest for arc-fault detection may be in the range 206 of FIG. 2. An optional filter 330 may be configured to bandlimit the signal received from the current transducer 306, or optional buffer 326 and/or matching network 308. The ADC 310 may then sample at a sampling rate greater than, or several times greater than, the frequency range of the band of interest 206. Digital filtering may then be used following the ADC to extract the signal of interest.

The filter 330 may also provide an anti-aliasing function depending on the type of ADC 310 coupled to the output of the filter 330. Alternatively, the anti-aliasing function may be implemented by the buffer 326 or the matching network 308.

Where analog filtering 330 is included prior to the ADC 310 to perform an analog bandpass or bandlimit of the frequency components of interest 206, the ADC 310 may be configured to under-sample the band of interest 206, having a sampling rate lower than the frequency band of interest 206. This is possible where the ADC has a sampling bandwidth greater than its conversion frequency, as then the energy will fold down to below the frequency of the band of interest 206 and still be captured by the ADC. Under-sampling in this manner may reduce the power usage and requirements of the ADC. Equally the ADC could have a sampling bandwidth within the frequency band of interest 206.

The current transducer 306 may be a di/dt or rate of change of current sensor. This type of current transducer 306 benefits from an output which is proportional to the frequency of the measured signal—because of this, it may be considered a form of high pass filter at the system level. The band-pass filter implemented by filter 330 may therefore be implemented at reduced cost and circuit complexity using two low-pass filters. For example, a first low-pass filter may have a corner frequency at the lowest frequency of the frequency range of interest 206 for arc-fault detection and a second low pass filter may have a corner frequency at the highest frequency of the frequency range of interest 206 for arc-fault detection. In this way, the combined response of the di/dt sensor and the two low-pass filter approximates a band-pass filter centred on the frequency range 206 applicable to arc-fault detection. For example, the filter 330 may implement an analog low-pass filter at 5 MHz and then another analog low-pass filter at 15 MHz, producing a low-cost $1^{st}$ order bandpass filter that could shape the signal of interest prior to the ADC. These filters could be passive or active. Whilst the filter 330 is shown as a separate element, it could instead be a part of the buffer 326 and/or the matching network 308 if these elements are present.

Figure 4:
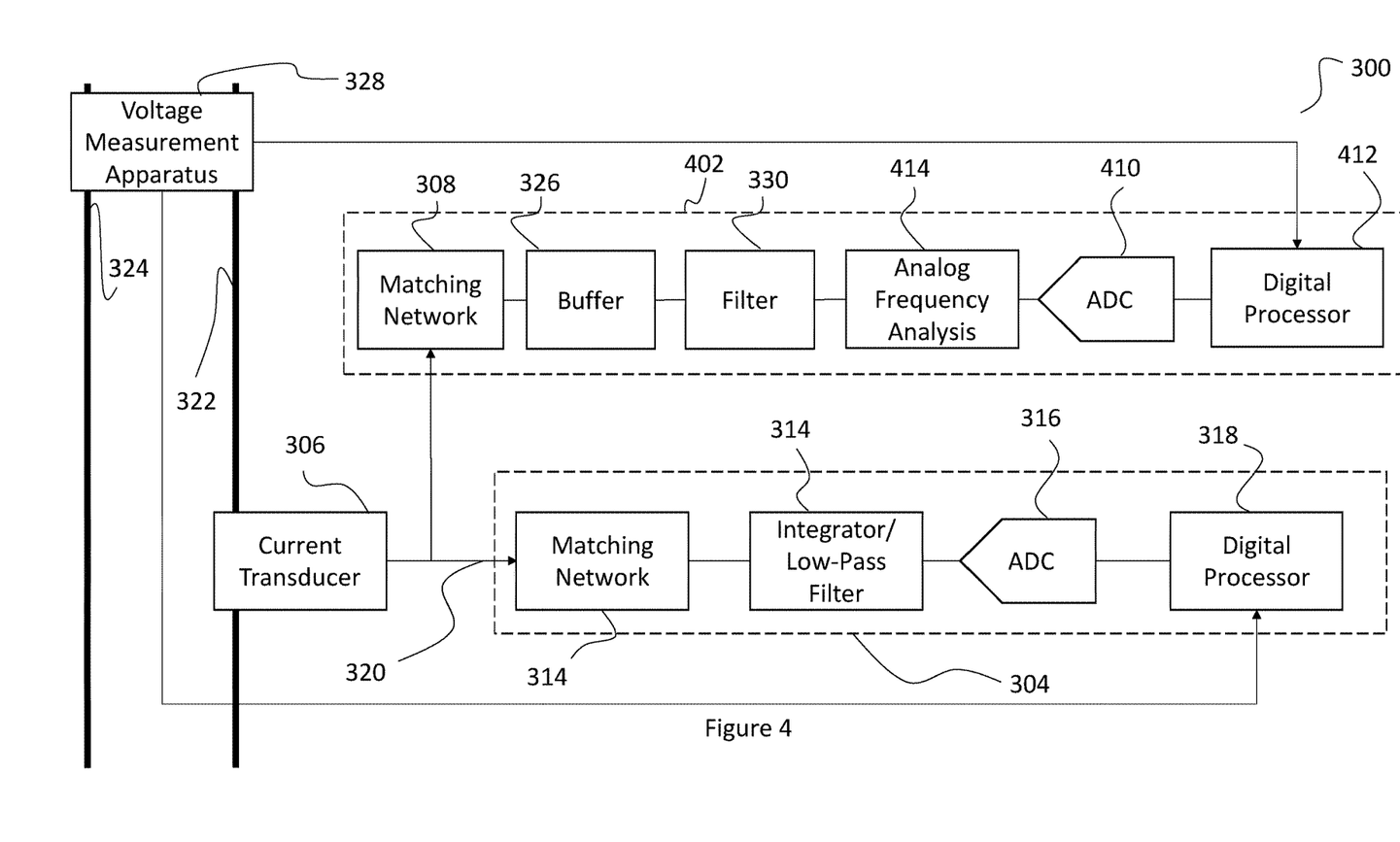
FIG. 4 is a second schematic of a measurement system for the detection of an arc-fault event in accordance with a further aspect of this disclosure.

Whilst the system of FIG. 3 includes an analog-to digital converter 310 and a digital frequency analysis system 312, it could equally be configured to provide an analog detection of an arc-fault event or analog processing before a digital detection of an arc-fault event, as shown in FIG. 4.

For example, FIG. 4 shows a system including an analog frequency analysis system 414. The matching network 308, buffer 326 and filter 330 are optional components and may be arranged in a different order to that shown in FIG. 4. The filter 330 may receive an output from the current transducer 306 and band pass filter this received signal. For example, the filter 330 may approximate a band-pass filter centred on the frequency range 206 which is applicable to arc-fault detection, or the frequency range of interest 206 for arc-fault detection. By band-pass filtering this received signal, the output of the filter contains signals only within a frequency band relevant to arc-fault detection.

The output of the filter 330 feeds an analog signal to the analog frequency analysis system or circuit 410. The analog frequency analysis system 410 may perform an operation on the received signal to create an output signal indicative of the energy contained in the current components within the frequency range of interest 206 for arc-fault detection. This may produce be a signal which is representative of the energy received at the input within the frequency band of interest 206. The analog frequency analysis system 412 may further or alternatively provide peak detection or RMS estimation on the input it receives.

For example, the analog frequency analysis system 414 may perform rectification and averaging of the received signal which has been band-passed by the filter 330, providing a signal which is indicative of the energy contained in the current components within the frequency range of interest 206 for arc-fault detection. Other means of providing a signal which is indicative of the energy over a frequency range may be used.

The system 414 may compare the rectified and/or averaged signal to a threshold which indicates that an arc-fault is occurring. For example, the analog frequency analysis system may include a variable threshold which is set at the time of manufacture to represent a level indicative of an arc-fault. If the rectified and/or averaged signal is greater than the threshold, an arc-fault may be detected.

This analog approach may be more power efficient, while the digital approach may allow more complex assessment of the arc fault waveform through machine learning and other advanced signal recognition beyond just energy measurement.

Whilst this arc-fault detection system 402 may be a completely analog arc-fault detection system, it may further or alternatively include an ADC 410 and a digital processor 412. As described above, the analog frequency analysis system 414 may produce a signal which represents the energy within the frequency band of interest 326 for arc-fault detection. This signal may be provided to an analog-to-digital converter 410, which converts the analog signal to a digital signal. The digital signal may be provided to a digital processor 412. The digital processor may determine the presence of an arc-fault event based on the magnitude of the signal which represents the energy within the frequency band of interest.

As this system operates to provide a simplified signal to the digital processor 412, the digital processor 412 need not perform any complicated frequency analysis, such as a fast-Fourier transform. Instead, the digital processor 412 may determine the presence of an arc-fault based on changes in the received signal which represents the energy within the frequency band of interest. For example, the digital processor may monitor the received signal over time, and determine the presence of an arc-fault event based on rapid changes in the energy within the frequency band of interest 206, for example, changes compared to an average of the energy over a period of time. Further, the digital processor may receive a measurement of the phase voltage from the voltage measurement apparatus 328 (the voltage between the live conductor under test 322 and the neutral conductor 324). The digital processor 412 may determine the presence of an arc-fault based on both the signal representative of the energy in the frequency band of interest 206 for arc-faults and the voltage across the conductors, for example based on the energy within the frequency band of interest 206 compared to the part of the AC voltage cycle that the energy network is currently in.

The second circuit 304, or second detection circuit, is configured to perform at least one of a current measurement, a short circuit detection, residual current detection and overcurrent protection. The second circuit 304 may also provide series arc-fault detection by considering the lower-frequency components.

The second circuit 304 comprises a second ADC 316 and a digital processor 318. The second ADC 316 may be any suitable type of ADC, for example a SAR ADC, a sigma-delta ADC, a pipelined ADC, etc. The second ADC 316 converts the current transducer 306 analog output into a digital signal and supplies this to the digital processor 318. The digital processor 318 may be configured to determine a current drawn by the electrical network under measurement by the current transducer 306, and more particularly to determine the current drawn by a current carrying conductor 322 of the electrical network which is under measurement by the current transducer 306. Alternatively, or in addition, to determining the current, power and energy, the digital processor 318 may determine a short-circuit or over current event in the electrical network or in the current carrying conductor.

As noted with respect to FIG. 2, components of the current which are related to short-circuits or current metrology are lower in the frequency range than those related to arc-fault detection. The second ADC 316 may therefore have a lower sample rate than the first ADC 310, allowing the second ADC 316 to trade-off bandwidth to have increased dynamic range and stability that are demanded by the metrology application, it may also therefore be a lower cost and complexity component, which may further allow a reduction in circuit space required by the second ADC 316. By providing separate first and second ADCs, the specific stability, bandwidth and accuracy requirements for the different applications may be met, reducing the cost of implementing the system as a single ADC which can meet all requirements is not required. Nevertheless, the system may be implemented with a single ADC operating in place of both the first ADC and the second ADC. Most commonly to provide the dynamic range this ADC would be a sigma delta ADC which, while it oversamples the input at a higher rate, the output word rate is at a much lower rate. For example, the second ADC 316 may have a sample rate of 16 ksps, 32 ksps, 64 ksps or 100 ksps.

The second detection circuit 304 may include a second matching network 314, configured to match the second circuit 304 to the impedance of the current transducer 306, preventing or reducing signal reflection. The skilled person will readily appreciate how to implement such a matching network and, as such, this will not be further described in this disclosure.

The second circuit may have gain and filtering prior to digitisation as the signal from the current transducer 306 can be very small and there is a need to be resilient to high frequency transients. In the case of a PCB di/dt sensor the full-scale signal at the 50 Hz fundamental may be as low as 1 mV RMS even for a 200 A signal, and there is a need to not saturate with a fast edge of a few Amps/uS which might generate a step of a few hundred mV on the same sensor. A di/dt sensor requires integration to get a flat frequency response in the band of interest for energy measurement which contains the fundamental frequency (typically 50 or 60 Hz) and multiple harmonics, for example up to 11, 25, 50, 100 harmonics, which is typically in the range of a 5-10 Hz to 10 kHz. This integration can be done in the analog domain, for example by integrator/low pass filter 314, but at the expense of noise and drift, or in the digital domain but this requires management of the dynamic range under fast transients to avoid clipping which will cause rectification that can lead to erroneous power. The signal may also need high pass filtering to avoid accumulation of offsets in the integration. The high pass filter should not be too close to the fundamental frequency or it will introduce unacceptable errors in phase or gain when the fundamental frequency shifts by a few %, for example, the high pass filter should have a corner frequency of 10 kHz, 20 kHz, or 50 kHz.

The second circuit 304 may optionally include an integrator or a band limiting low-pass filter 314 on top of an anti-alias filter to handle di/dt sensors. In the case of a digital integrator solution the low pass 314 may be used to prevent high di/dt current pulses from passing to the second ADC 316 and the digital processor 318, due to the decreasing gain of the low pass filter 314 at high signal frequencies. This helps prevent signal saturation at the ADC 316 or any amplifier in the signal path.

As well as determining the current in the conductor 322, the digital processor 318 may also provide power and energy calculations. The digital processor 318 may receive a measure of the voltage across the live 322 and neutral 324 conductors from the voltage measurement apparatus 328 in order to calculate the power and/or energy measurements.

Figure 5:
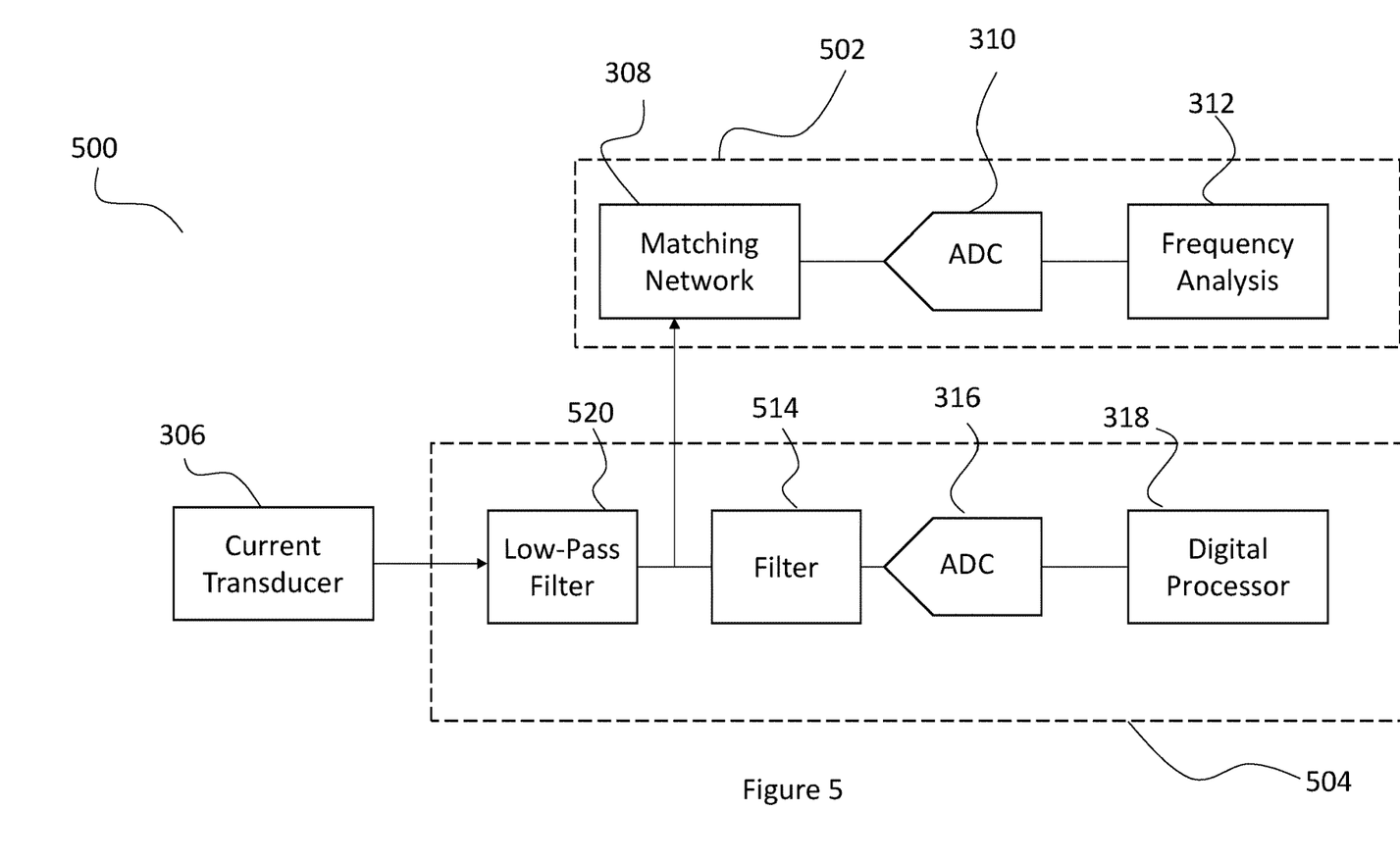
FIG. 5 is a second schematic of a measurement system for the detection of an arc-fault event in accordance with a further aspect of this disclosure.

The system 300 of FIG. 3 includes the first circuit 302 and the second circuit 304 both sourcing the output of the current transducer 306 from node 320. FIG. 5 indicates a measurement system similar to that of FIG. 3 and FIG. 4, with like reference numerals relating to like parts. The description of FIGS. 3 and 4 is therefore also relevant to the system of FIG. 5. For example, the first and second circuits of FIG. 5 may include any of the components shown in the first and second circuits of FIGS. 3 and 4.

In FIG. 5, the measurement system 400 includes a first circuit 502 and a second circuit 504. The first circuit 502 is configured to perform a frequency analysis on the output of the current transducer 306 to determine the occurrence of an arc-fault event, as described with respect to FIG. 3. The second circuit 504 is configured to perform a current measurement and/or short-circuit detection, as described with respect to FIG. 3.

The integrator/low-pass filter 514 of FIG. 5 may be an RC filter, including a first resistor and a second resistor connected in series, with a first capacitor coupled to the first resistor and a ground node or reference voltage node.

The first circuit 502 is coupled to the current transducer 306 through, via or after the low-pass filter 520 of the second circuit 504. The low-pass filter 520 may have a corner frequency set above the frequency range of interest 206 for arc-fault detection. In this manner, both the first and second circuits are protected from very high frequency signals. The first circuit may have a second filter 514, with a lower corner frequency than the corner frequency of the first filter 520. By coupling the first circuit 502, or the first ADC 310, to the current transducer 306 in this manner, the first circuit 502 may be protected from very large di/dt signals, which may be measured by the current transducer 306. It will be appreciated that this filter may be implemented in many different ways, for example as components around an amplifier that may provide gain as well as bandwidth control to the system. The filter 514 may limit the signal from the transducer such that the ADC 316 does not respond to it, but it may also perform analog integration if it is set to be below the frequency range of interest relevant to current measurement, e.g. at 5 Hz when the fundamental is at 50 Hz particularly where the current transducer 306 is a rate of change of current sensor, flattening the rate of change of current sensor frequency response by the integrator/low pass filter 514. By contrast with a rate of change sensor system that uses a digital integrator after the ADC to flatten the response, this low pass filter performs the task of limiting the bandwidth and response of the sensor above the frequency of interest, often 10's of harmonics above the fundamental.

By providing a first low-pass filter 520 both the first circuit 502 and the second circuit 504 are protected from very high frequency noise such as RF noise. The second low-pass filter acts to filter only signals provided to ADC 316, and as such may have a much lower corner frequency suitable for metrology.

The filter 520 may be implemented as an RC low-pass filter. For example, the low-pass filter 520 may be formed of a discrete resistor and a discrete capacitor. Alternatively, where the current transducer 306 is a Rogowski coil, the low-pass filter may be formed from the trace resistance of the Rogowski coil and a discrete capacitor coupled to the output of the Rogowski coil, allowing fewer components to be used.

Any suitable type of low-pass filter/integrator may be used. The first circuit may then be coupled to the current transducer after the low-pass filter. The low pass filter may be implemented as part of a gain stage in the input or feedback network.

Figure 6:
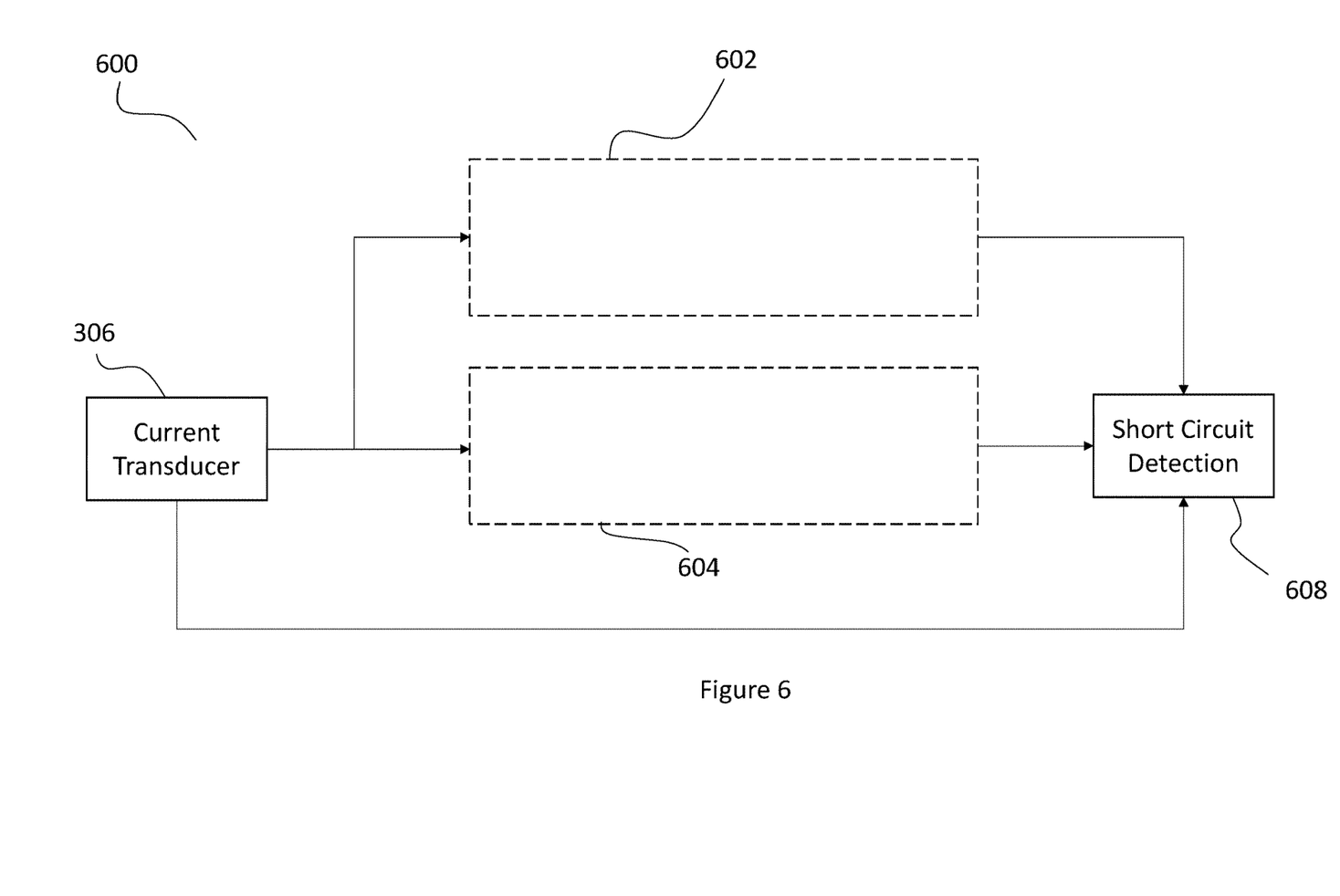
FIG. 6 is a second schematic of a measurement system for the detection of an arc-fault event in accordance with a further aspect of this disclosure.

The short circuit detection function may use information from both paths, such that it receives information from both the first circuit and the second circuit relating to the current draw over a wide frequency range 208. For example, FIG. 6 shows a system 600 including a first circuit 602 and a second circuit 604 as well as a short-circuit detection system 608. The first circuit 602 may operate in the manner described with respect to the first circuits 302, 402, 502 of FIGS. 3-5, as well as providing a signal to the short-circuit detection circuit 608 indicative of the high frequency current components within the range 206. The second circuit 604 may operate in the manner described with respect to the second circuits 304, 404, 50 of FIGS. 3-5, as well as providing a signal to the short-circuit detection circuit 608 indicative of the low frequency current components within the range 202 and/or 204. As such, these circuits are not described in detail here. In this manner, the first circuit 602 provides high-frequency analysis of the current in the current carrying conductor 322 suitable for arc-fault detection, whilst the second circuit 604 provides low-frequency analysis (relative to that of the first-circuit) of the current in the current carrying conductor 322 suitable for current measurement and metrology. In the case of marginal over current conditions (i.e. where the short-circuit is a small short-circuit with a relatively high ohmic resistance) the system will need to operate with the greater accuracy of the lower bandwidth metrology path 604, and will consider the signal over a longer time to make the decision that a short-circuit has been detected, this path may use sigma deltas or over-sampled SAR ADCs that after their filters have relatively long latencies and sample rates of 10 ksps, 20 ksps, 50 ksps or 100's ksps. To detect a high current short circuit, particularly when there is a latency critical response time, such as when a circuit breaker is reset and the short is still present the short circuit detection system 608 may need to use information from the high speed path 602 used for the AFCI detect by considering the high frequency components 206. For latency critical applications, the processing after the ADC in the first circuit 602 may need to be supplemented with an additional path to deliver the desired detection bandwidth in the 10 Hz to 100 kHz range as opposed to the few MHz range. For example, the stream from the high frequency ADC may go into a separate digital integrator and a high pass and low pass filter, than the stream going to the AFCI detect.

Alternatively, or in addition, the short-circuit detection circuit may be directly coupled to the current transducer. Where the short circuit-detection system 608 receives a dedicated input from the current transducer 306, the short-circuit detection system 608 may include its own dedicated analog adaption and ADC or threshold comparator for low latency high current short circuit determination. This system (the dedicated path from the current transducer 306 to the short circuit detection circuit 608 and its respective components) may be activated only after a circuit breaker has been tripped and reset, lowering the overall power requirements of the system As previously described, the first circuit 602, the second circuit 604 and the short-circuit detection system 608 may include an input for receiving a voltage measurement of the phase voltage. This allows these circuits to determine the phase of the event for both the short circuit detection and the arc-fault detection, and to determine if an interruption is needed or if a notification of event needs to be sent somewhere.

These functions can be integrated in a system with residual current detection to provide a combination device where some of the functions may share resources with the residual current detection, for example there could be a separate measurement of the current in the live and neutral conductors to determine the delta current that could share resources with the metrology measurement path. For example, the current measurement in one conductor (e.g. the live conductor) may be performed by the current measurement system according to any of FIGS. 3-5 and the current in a second or neutral conductor may be performed by a separate current measurement system. Alternatively, the system may determine the current in the first conductor and provide this to a separate residual current detection device, or residual current circuit breaker device (RCCB). The residual current circuit breaker may include the standard means for determining a residual current, for example, a transformer which surrounds both the live and neutral conductors. The residual current circuit breaker may then determine whether to break the circuit based on both the residual current detected by the transformer and the current measured by the metrology circuit.

By using a single current transducer 306 to measure current, the output of which is used both to provide arc-fault detection and short-circuit and/or metrology and/or residual current functions, the physical size and the cost of the system may be reduced substantially compared to the provision of dedicated systems for each arc fault detection, short-circuit functions, residual current functions and metrology functions. This may allow the system 300, 400 to be installed to monitor the current related to a smaller electrical network, for example as a greater number of the systems will fit into the same size electrical metering or safety unit. For example, the system may be installed in a circuit breaker, with a system provided per circuit within a premises. In a home or domestic electrical network, a single system may provide arc-fault detection and also metrology and/or short-circuit detection and/or residual current detection for a single room or a single circuit (such as a lighting ring for a part or a floor of the premises, or an electrical outlet ring for a part or a floor of the premises). Consequently, a consumer unit having multiple RCDs or circuit breakers may include within each RCD or circuit breaker, arc-fault detection functionality. This further allows greater granularity to be provided to an electrician on the location of the fault when compared to only providing arc-fault detection for the overall electrical network. Further, the arc-fault detection circuit may be part of an arc-fault circuit interrupt circuit (AFCI), configured to disconnect the faulty circuit from the supply when an arc-fault is detected, whilst leaving other circuits unaffected.

Where the detection system according to any of FIGS. 3-6 is included within a circuit breaker, the circuit breaker may be operative to trip or break the connection to the electrical network when at least one of an arc-fault, a short-circuit, a residual current or an overcurrent condition is detected.

The measurement systems described with relation to FIGS. 3 and 4 both include a first circuit 302, 402 and a second circuit 304, 404. The packaging of these circuits may provide varying advantages to the overall measurement system in terms of measurement accuracy, space requirement, component requirement, replaceability, etc.

Figure 7A:
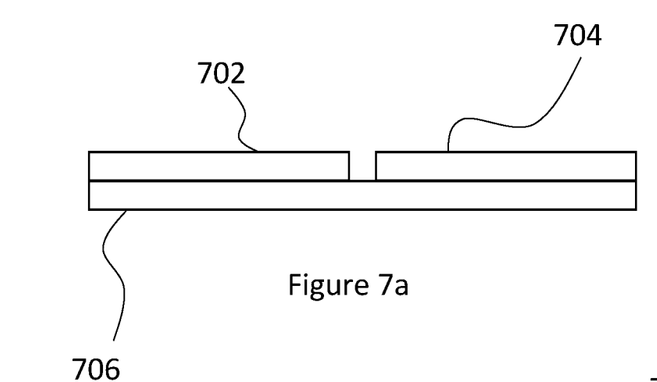
FIG. 7a is a first circuit board layout of the measurement system.
Figure 7B:
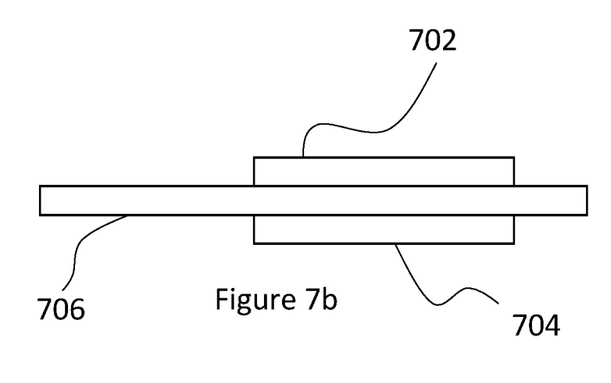
FIG. 7b is a second circuit board layout of the measurement system.

The first circuit 302, 402 and the second circuit 304, 404 may be packaged separately, for example in separate integrated circuits. By packaging the circuits separately, the second circuit 304, 404 may be positioned closer to the current transducer than the first circuit 302, 402, reducing the effect of external magnetic field coupling into the first circuit by reducing the routing length. As the second circuit provides metrology functions, external magnetic field coupling can have a large impact on the accuracy of the current measurement. In contrast, the arc-fault detection circuit is arranged to provide an indication that there is, or is not, an arc-fault, and it may therefore be acceptable for there to be greater external magnetic field coupling into this circuit than the metrology circuit.

Where the packages are separate, the first circuit 302, 402 and the second circuit 304, 404 may be located on separate printed circuit boards, or on different sides of the same circuit board. For example, as shown in FIG. 7a, a first integrated circuit 702 may provide the functions of the first circuit 302, 402 and a second integrated circuit 504 may provide the functions of the second circuit 304, 404. The first circuit and the second circuit may be provided on the same side of a printed circuit board 706 and coupled to the printed circuit board 706. The printed circuit board 706 may include a printed circuit board implemented rate of change of current sensor, for example, a PCB implemented Rogowski coil which acts as the current transducer 306, 406. Alternatively, as shown in FIG. 7b, the first integrated circuit 702 and the second integrated circuit 704 may be located on opposite sides of the printed circuit board 706. By providing the packages on different sides of the same circuit board, the conductive traces on the printed circuit board 706 may be positioned to provide some amount of cancellation of fields and further ensure that both packages are located only a short distance from the current transducer.

Figure 7C:
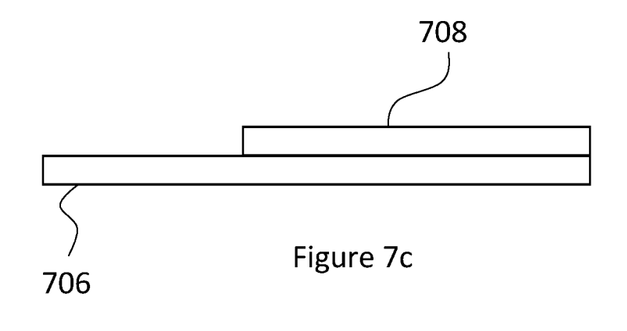
FIG. 7c is a third circuit board layout of the measurement system.

The first circuit 302, 402 and the second circuit 304, 404 may be co-packaged, or packaged together in a single integrated circuit. Packaging the circuits together may reduce the size of the overall system, allowing it to take up a smaller space. For example, as shown in FIG. 7c, a single integrated circuit 708 may provide the functions of both the first circuit 302, 402 and the second circuit 304, 404. The integrated circuit 708 may be coupled to a printed circuit board, which as described above may optionally include a printed circuit board implemented current transducer, for example a PCB implemented Rogowski coil. Co-packaging may allow the routing length between the current transducer 306 and the frequency analysis/digital processor circuits 302, 402 to be reduced, reducing the impact of external magnetic field coupling. This co-packaged circuit may provide improved reduction of external magnetic field coupling for both the metrology and arc-fault circuits.

The first circuit 302, 402 and the second circuit 304, 404 may alternatively be packaged such that analog components (components which process signals in the analog domain) and digital components (components which process signals in the digital domain) are packaged separately. ADCs which are present may be included in either the analog package or the digital package. For example, the system may comprise a first analog die including all analog processing components from the first circuit 302, 402 and the second circuit 304, 404. The system may also comprise a digital die including all digital processing components from the first circuit 302, 402 and the second circuit 304, 404. For example, the analog die may include the components 308, 326, 320, 314 from the first and second circuits of FIG. 3. The digital die may include the components 312 and 318 from the first and second circuits of FIG. 3. The ADCs 310, 316 may be included on either the analog die or the digital die. This may allow a simpler manufacturing process to be used.

Whilst the system is described above as including an arc-fault detection circuit and a second detection circuit, the system may alternatively include a first functional circuit and a second functional circuit coupled to the current transducer. The first functional circuit and the second functional circuit may be configured to perform different functions, such as: current measurement; arc-fault detection; short-circuit detection; residual current detection; residual current circuit breaking. As the first functional circuit and the second functional circuit are coupled to the same current transducer, the system may be provided in a smaller space, or provide a greater number of functions in the same space.

Where the current transducer is a Rogowski coil, the Rogowski coil may be a printed circuit board implemented Rogowski coil, provided on the same printed circuit board as the first circuit and second circuit. Alternatively, the Rogowski coil may be a traditional Rogowski coil, which is not provided on a printed circuit board. The traditional Rogowski coil may then be coupled to the first circuit and the second circuit by any suitable means. Alternatively, the current transducer may be any other type of current transducer, such as a current shunt.

Various modifications whether by way of addition, deletion, or substitution of features may be made to the above described examples to provide further examples, any and all of which are intended to be encompassed by the appended claims.

The terminology "coupled" used above encompasses both a direct electrical connection between two components, and an indirect electrical connection where the two components are electrically connected to each other via one or more intermediate components.

The invention claimed is:

1. A measurement system for the detection of arc-faults, the measurement system comprising:
a rate of change of current sensor for measuring a rate of change of current in a current carrying conductor;
an arc-fault detection circuit having a first frequency band processing path for detecting arc-faults, the arc-fault detection circuit comprising:
a first analog-to-digital converter, ADC, having an input that is coupled to an output of the rate of change of current sensor;
a frequency analysis circuit coupled to an output of the first ADC, wherein the frequency analysis circuit is configured to detect arc-faults; and
a second detection circuit having a second frequency band processing path, wherein the second frequency band is different than the first frequency band, the second detection circuit comprising:
a low-pass filter coupled to the output of the rate of change of current sensor;
a second analog-to-digital converter, ADC, coupled to an output of the low-pass filter;
a digital integrator coupled to an output of the second ADC, the digital integrator configured to generate an integrated signal;
a digital processor configured to receive the integrated signal, the digital processor configured to determine at least one of:
a measure of the current in the current carrying conductor;
the presence of a short-circuit; and
the presence of a residual current,
wherein the arc-fault detection circuit and the second detection circuit are configured to simultaneously process the different first and second frequency bands from the rate of change of current sensor; and
a voltage measurement apparatus configured to measure a voltage between the current carrying conductor and a neutral conductor, wherein the voltage measurement is used in conjunction with both the arc-fault detection circuit and the second detection circuit.

2. The measurement system according to claim 1, wherein the first ADC has a first sample rate and the second ADC has a second sample rate, the first sample rate being higher than the second sample rate.

3. The measurement system according to claim 2, wherein the first sample rate is greater than 1 Msps.

4. The measurement system according to claim 2, wherein the first sample rate is greater than 100 Msps.

5. The measurement system according to claim 1, wherein the frequency analysis circuit detects arc-faults through the detection of frequency components of the measured current in the 100 kHz-10 MHz frequency range.

6. The measurement system according to claim 1, wherein the frequency analysis circuit is configured to detect arc-faults in dependence on the voltage measurement.

7. The measurement system according to claim 1, wherein the digital processor is configured to determine a power or energy consumption of the network based on the measure of the current and the voltage measurement.

8. The measurement system according to claim 1, wherein the measurement system further comprises:

a circuit breaker configured to break the current in the first current carrying conductor when an arc-fault, a short-circuit or a residual current is detected.

9. The measurement system according to claim 1, wherein the arc-fault detection circuit and the second detection circuit are co-packaged in a same integrated circuit.

10. The measurement system according to claim 1, wherein the arc-fault detection circuit and the second detection circuit are packaged separately in different integrated circuits.

11. A system comprising:
a first circuit for coupling to an output of a rate of change of current sensor that is for measuring a current in a current carrying conductor, the first circuit having a first frequency band processing path and configured to perform a frequency analysis on the output of the rate of change of current sensor to detect an arc-fault event based on frequency components of the measured current in a first frequency range; and
a second circuit for coupling to the output of the rate of change of current sensor, the second circuit having a second frequency band processing path, wherein the second frequency band is different than the first frequency band, the second circuit including:
a low-pass filter coupled to the output of the rate of change of current sensor;
an analog-to-digital converter, ADC, coupled to an output of the low-pass filter; and
a digital integrator coupled to an output of the ADC, the digital integrator configured to generate an integrated signal,
wherein the second circuit is configured to perform at least one of:
a current measurement;
short-circuit detection;
residual current detection,
wherein the first circuit and the second circuit are configured to simultaneously process the different first and second frequency bands from the rate of change of current sensor; and
a voltage measurement apparatus configured to measure a voltage between the current carrying conductor and a neutral conductor, wherein the voltage measurement is used in conjunction with both the first circuit and the second circuit.

12. The system according to claim 11, wherein the first circuit comprises:
a filter configured to band-pass filter the output of the rate of change of current sensor to within the first frequency range; and
an analog frequency analysis system, the analog frequency analysis system configured to produce a rectified and averaged signal of an output of the band-pass filter.

13. The system according to claim 12, wherein the first circuit further comprises:
an analog-to-digital converter configured to receive an output of the analog frequency analysis system and provide a digital output; and
a digital processor configured to receive the digital output from the analog-to-digital converter and detect the arc-fault based on the magnitude of the digital output.

14. The system according to claim 12, wherein the analog frequency analysis system is further configured to compare the rectified and averaged signal to a threshold, wherein the threshold is indicative of an arc-fault event.

15. The system according to claim 11, wherein the second circuit is configured to perform a current measurement and a short-circuit detection based on the frequency components of the measured current within a second frequency range.

16. A system comprising:
a rate of change of current sensor;
a first circuit coupled to an output of the current sensor and having a first frequency band processing path; and
a second circuit coupled to the output of the current sensor and having a second frequency band processing path, wherein the second frequency band is different than the first frequency band, wherein the second circuit includes:
a low-pass filter coupled to the output of the rate of change of current sensor;
an analog-to-digital converter, ADC, coupled to an output of the low-pass filter; and
a digital integrator coupled to an output of the ADC, the digital integrator configured to generate an integrated signal,
wherein the first circuit is configured to perform at least one detection function and the second circuit is configured to perform at least one detection function different from the detection function performed by the first circuit, and
wherein the detection functions comprise:
arc-fault detection;
short-circuit detection;
current measurement;
residual current detection,
wherein the first circuit and the second circuit are configured to simultaneously process the different first and second frequency bands from the rate of change of current sensor; and
a voltage measurement apparatus configured to measure a voltage between the current carrying conductor and a neutral conductor, wherein the voltage measurement is used in conjunction with both the first circuit and the second circuit.

17. The rate of change of current sensor according to claim 16, wherein the rate of change of current sensor is a Rogowski coil.

18. The system according to claim 16, wherein the first circuit comprises:
a filter configured to band-pass filter the output of the rate of change of current sensor to within the first frequency range; and
an analog frequency analysis system, the analog frequency analysis system configured to produce a rectified and averaged signal of an output of the band-pass filter.

19. The system according to claim 18, wherein the first circuit further comprises:
an analog-to-digital converter configured to receive an output of the analog frequency analysis system and provide a digital output; and
a digital processor configured to receive the digital output from the analog to digital converter and detect the arc-fault based on the magnitude of the digital output.

* * * * *